United States Patent [19]

Bender et al.

[11] Patent Number: 5,035,179
[45] Date of Patent: Jul. 30, 1991

[54] PROCESS FOR COVERING A TUBE WITH A FOIL, AND AN IGNITER ELEMENT PRODUCED BY SAID PROCESS

[75] Inventors: Richard Bender, Lauf; Anton Bretfeld, Furth, both of Fed. Rep. of Germany

[73] Assignee: Dynamit Nobel Aktiengesellschaft, Troisdorf, Fed. Rep. of Germany

[21] Appl. No.: 539,449

[22] Filed: Jun. 18, 1990

[30] Foreign Application Priority Data

Jun. 22, 1989 [DE] Fed. Rep. of Germany ....... 3920402

[51] Int. Cl.⁵ .............................................. F42C 19/10
[52] U.S. Cl. ................................................. 102/202.5
[58] Field of Search .................. 102/202, 202.5, 202.7, 102/202.8, 202.9, 202.11, 202.12, 202.13, 202.14, 204, 205

[56] References Cited

U.S. PATENT DOCUMENTS

| | | | |
|---|---|---|---|
| 520,116 | 5/1894 | Mason | 102/202.9 |
| 1,163,937 | 12/1915 | Macomber | 102/204 |
| 2,240,438 | 4/1941 | Durant | 102/202.14 |
| 2,868,128 | 1/1959 | Ramsey | 102/204 |
| 3,295,446 | 1/1967 | Harnau | 102/202.9 |
| 4,103,619 | 8/1978 | Fletcher et al. | 102/202.5 |

FOREIGN PATENT DOCUMENTS 3416735 11/1985 Fed. Rep. of Germany ... 102/202.5

*Primary Examiner*—Charles T. Jordan
*Attorney, Agent, or Firm*—Antonelli, Terry, Stout & Kraus

[57] ABSTRACT

For the purpose of welding one side of a metallic foil to a relatively thick-walled metal tube, it is proposed to cover the foil from the other side in an annular fashion with a similar or identical tube section also made of metal and to join the tube and the tube section from the outside by means of welding, e.g., plasma welding; in this procedure, the welding bond is not allowed to extend through the entire tube wall thickness. In this way, tubular elements such as cylindrical casings of primer caps can be made tight, which primer caps can be filled from the front in a simple way, but wherein it has thus far been difficult to test for the reliability of the cover formed over a primer charge.

6 Claims, 1 Drawing Sheet

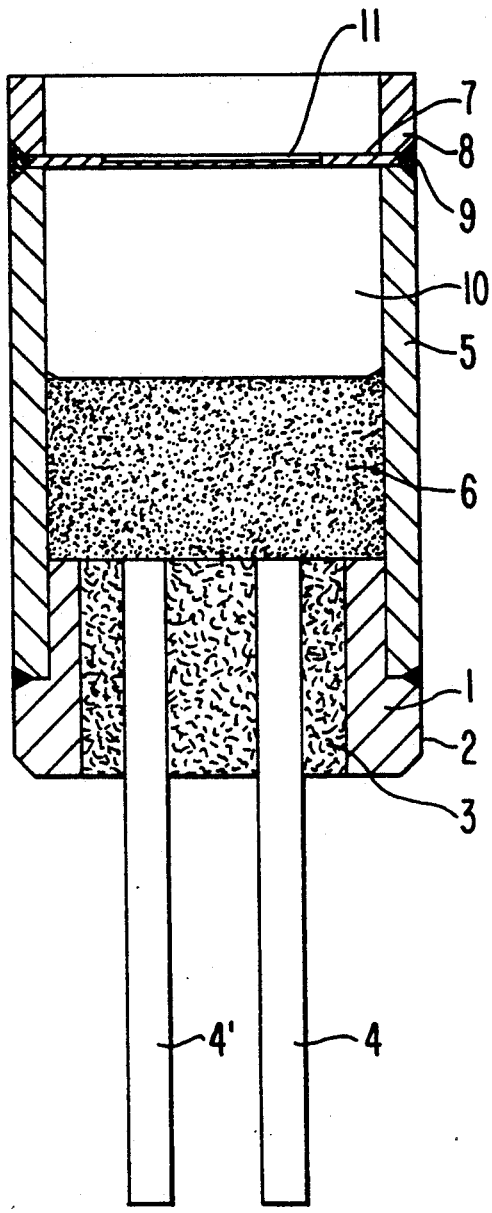

PROCESS FOR COVERING A TUBE WITH A FOIL, AND AN IGNITER ELEMENT PRODUCED BY SAID PROCESS

This invention relates to a process for the gastight covering of an aperture formed or defined by a relatively thick-walled tubular element providing a flange I of a weldable material with a metallic foil wherein the foil rests on the flange I and is attached thereon by means of a weld seam, as well as to an igniter element consisting of a cylindrical casing containing a primer charge and covered with a foil by the same process.

DE 3,416,735-A1 discloses a primer element wherein a primer charge in a capsule or casing is sealed with a cap on a mounting sleeve. During the production, a laser welding method is employed, but even in this highly precise procedure it is difficult to establish a gastight connection of the cap with the more solid casing, especially if the cap is thin like a foil. A direct, tight welding of a foil to the planar annular surface of the casing is not possible because holes are burnt into the foil during this operation; for this reason, the foil is preformed in the shape of a cap and drawn over the rim of the casing, and welded on the outside to the cylindrical outer surface of the casing. However, even this bonding process cannot entirely preclude an excessive melting of the foil at some locations, resulting in a leak in the thus-produced cover.

Since nondestructive tests for tightness of such a cover on the casing of a primer element are very expensive, it is an object of the invention to design the process for bonding a foil to a capsule or casing so that a gastight connection is achieved with a higher degree of certainty.

This object has been attained by a process characterized in that the rim or periphery of the metal foil which rests on a flange I of a tubular element without being connected thereto is covered by a flange II of a tube section having the same edge contour as flange I, and the abutting flanges are joined by a weld seam wherein the root or base of the weld seam formed from the outside, over the entire periphery of the flanges, does not reach the inner region of the flanges.

The igniter element of this invention is characterized in that a cylindrical capsule or casing, i.e. a metal tubular element, is extended by a metal tube section having a cross-section similar or identical to the capsule, a metallic foil is inserted between the capsule and the tube section, the capsule and the tube section are butt-welded only on their outside, rather than in the entire cross-section of the wall thickness, i.e. so that the root of the weld seam nowhere extends up to the inner walls of the capsule and of the tube section.

The weld seam on the outside of the tubular element is located exactly at the level of the foil, by means of which an opening defined by the cross-section of a relatively thick-walled tubular element is to be covered. For the sake of simplicity, the rim surrounding the opening to be covered is denoted as flange I, wherein normally the "flange", considered to be the tube end, is machined to be planar. Flange I need merely be suited as a supporting surface for the foil. Flange II is the rim of the tubular section which defines a continuation of the opening, based on flange I, i.e. normally also a tube section with a planar rim wherein the dimensions as well as the remaining material properties of flange I and flange II must be adapted to each other; they are preferably identical. Also, it is preferred for the flange I to be substantially planar. The usually V-shaped weld seam connecting the two flanges from the outside must not extend over the entire wall thickness of the flanges; i.e. the weld operation is intentionally not a "fusing step"; a weld is desired with a root that recedes or closes at all locations. The exact position of the root in the gap formed by flange I and flange II is generally not critical; it is of no importance for the strength whether 60% or 65% of the cross-sections of the flanges are joined by a weld seam since the frontal, short tube section (usually within the millimeter range) is under minimum stress. However, as far as the metal foil is concerned, melting of the flange material at the rim is completely adequate whereby the foil is entirely "bonded in place" between the two flanges. Once the optimum values for the connection of the two flanges have been determined by preliminary tests, the tightness of the cover of the foil on flange I is automatically ensured, particularly in plasma welding.

The process is described in further detail below for the manufacture of plasma-welded igniter elements; the FIGURE shows an igniter element loaded from the front, with a cover foil welded to the front in accordance with this invention.

The basic structure of such an igniter element is known from DE 3,416,735-A1. A mounting sleeve 1, preferably of steel, with a connecting flange 2, surrounds an insulating member 3 carrying a thin-film ignition bridge, not shown, to which electrical energy can be supplied by way of the two terminal pins 4, 4'. The connection of the sleeve 1 and the terminal pins 4, 4' with the insulating member 3, preferably being of a ceramic material, must remain gastight even after numerous temperature changes; this connecting technique is perfected, for example by metallizing the ceramic material along the sealing surfaces and by brazing or embedding of the metallic parts in glass solder in the ceramic material.

A cylindrical sleeve or casing 5, also preferably made of steel, is welded to the mounting sleeve 1. With such a structure of an igniter element, the primer charge 6 can be pressed in a very precise fashion onto the ignition bridge on the insulating member 3. This advantageous, very simple and exact manufacturing process can be utilized because, according to this invention, covering of the primer charge is now likewise flawlessly possible. The forward planar end of the casing 5 is covered with a steel foil 7 having a thickness of 0.1 to 0.35 mm; a further tube section 8 of the same material and having the same dimensions and properties as the casing 5 is placed onto the rim; the foil 7 is clamped in sandwich fashion between the tube 5 and the tube section 8. With the placing of a seam 9 by means of a plasma welding, the tube 5 and the tube section 8 are joined, and the foil 7 is bonded in the marginal region to the seam 9 in such a way that the space 10 above the charge 6 is sealed in a gastight and watertight manner. In the process of this invention, the welding step must not be a complete "fusing", i.e. the root of the weld does not extend completely through the spacing or gap between the adjacent rims; the seam root is located (in all cases) within the "gap" formed by the two abutting cylinders 5 and 8, respectively. With this seam formation, the burning of holes into the foil is avoided with certainty. The degree of welding through of the seam can be very simply controlled in plasma welding. The wall thickness of the capsule or casing 5 is about 0.5 to 1.0 mm, and the strength of the bond between the tube 5 and the tube section 8 is also adequate even if only 30% or 50% of the wall cross-section is joined by the weld seam.

The plasma-welded seam 9 is located in all cases at the level of the cover foil 7; however, this process allows latitude as regards the distance at which the foil 7 is to be arranged above the charge 6. An interspace 10 between the foil 7 and the charge 6 results in even greater safety from ignition of the charge 6 during plasma welding.

An intentional breaking zone can be produced—if necessary—within the foil 7 by embossing or impressing a star 11. It has been found that, with sufficient control of the welding procedure, the foil 7 in all cases tightly covers the primer charge 6 and any additional tests in this respect are superfluous.

It will be appreciated that the welding may be effected by the more precise laser welding technique if desired.

What is claimed is:

1. An igniter element, comprising a metal cylindrical casing containing a primer charge and covered with a metal foil, characterized in that the cylindrical casing is extended by a metal tube section having a cross-section similar or identical to that of the cylindrical casing; the foil is inserted between the casing and the tube section; the casing and the tube section are butt-welded only on their sides, rather than in the entire wall thickness cross-section, so that the root of the weld seam nowhere reaches up to the inner wall of the casing or of the tube section.

2. An igniter element according to claim 1, characterized in that the weld seam is laser-welded or plasma-welded.

3. An igniter element according to claim 1, characterized in that the casing projects past the primer charge and a free space is provided between the foil and the primer charge within the casing.

4. An igniter element according to claim 2, characterized in that the casing projects past the primer charge and a free space is provided between the foil and the primer charge within the casing.

5. An igniter element according to claim 1, wherein the metal tube section has a cross-section identical to that of the cylindrical casing and a periphery of the foil extends between the cylindrical casing and the metal tube section so that the casing and the metal tube section are separated by the foil.

6. An igniter according to claim 5, wherein the cylindrical casing has an annular planar end portion and the metal tubular section has an annular planar end portion, said periphery of said foil being positioned between said planar end portions.

* * * * *